United States Patent [19]

Mock

[11] Patent Number: 5,577,917
[45] Date of Patent: Nov. 26, 1996

[54] METHOD OF A MEANS FOR GENERATING A CHILDREN'S WEEKLY INTERACTIVE SCROLLING CALENDAR APPARATUS

[76] Inventor: Susan E. Mock, R.R. #3, Box 1135, Middlebury, Vt. 05753

[21] Appl. No.: 439,433

[22] Filed: May 11, 1995

[51] Int. Cl.$^6$ .................................................. G09B 19/00
[52] U.S. Cl. ........................ 434/304; 434/418; 434/426
[58] Field of Search ................................. 434/238, 304, 434/416, 412, 418, 426, 429

[56] References Cited

U.S. PATENT DOCUMENTS

| | | | |
|---|---|---|---|
| 524,617 | 8/1894 | Slaughter | 434/412 |
| 728,092 | 12/1904 | Willson | 434/426 |
| 1,479,876 | 1/1924 | Shirley | 434/426 |
| 1,864,022 | 6/1932 | Jewell | 434/426 |
| 2,863,603 | 12/1958 | Doupnik | 434/238 |
| 2,965,978 | 12/1960 | Olson | 434/238 |
| 5,496,070 | 3/1996 | Thompson | 434/304 |

FOREIGN PATENT DOCUMENTS

| | | | |
|---|---|---|---|
| 123006 | 10/1948 | Sweden | 434/418 |
| 17856 | of 1894 | United Kingdom | 434/418 |

*Primary Examiner*—Paul J. Hirsch
*Attorney, Agent, or Firm*—Thomas N. Neiman

[57] ABSTRACT

The means for generating a children's weekly interactive scrolling calendar apparatus comprises the use a wall mounted unit that has two vertical spindles mounted on a solid frame made of wood or the like. The spindle contain a roll of paper that is scrolled from one spindle to the other spindle and, at the same time, keeps the paper flat at all times by passing below retaining pieces at each end of the open central area of the apparatus. A sliding guide and indentation markings allows the children to set up a seven day week and record their activities throughout the week and then scroll up the week after it has been concluded. A new week is then prepared. The calendar can then be unrolled at the end of the semester or year and the activities can be reviewed. The apparatus can be replaceably attached to a wall. A method of generating the children's weekly interactive scrolling calendar is also disclosed.

10 Claims, 2 Drawing Sheets

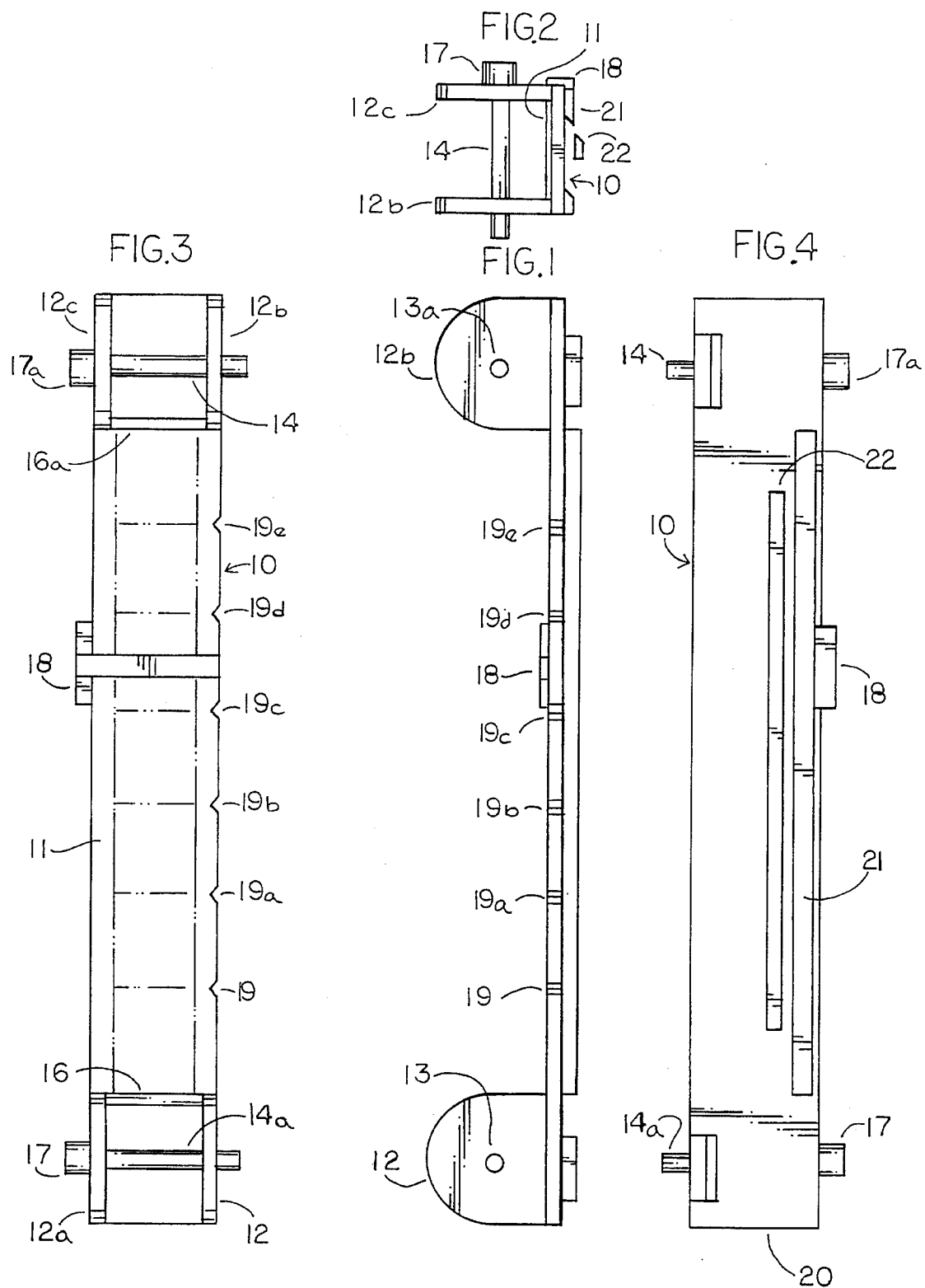

METHOD OF A MEANS FOR GENERATING A CHILDREN'S WEEKLY INTERACTIVE SCROLLING CALENDAR APPARATUS

BACKGROUND OF THE INVENTION

This invention pertains to calendars, and, in particular, to a children's weekly interactive scrolling calendar apparatus in order to allow teachers, individuals and children working with children to help them to develop their sense of time with the use of visual and tangible means.

There are a great number of calendars on the market today. Some of these units are scrolling calendars and some allow individuals to mark the calendar as it is being used. None of the currently used units provide a unique approach of providing a scrolling unit that allows total interaction between the children using the calendar and the days of the week. A unique method of producing and operating the calendar is also disclosed.

Clearly, it is desirable for an apparatus of this type to be lightweight and easily handled. At the same time, the apparatus should be easy to install and be extremely simple to attach to a wall or blackboard and, at the same time, be very effective. An object of this invention is to provide an apparatus that has an ease of manufacture and ease of assembly. It is another object of this invention to set forth an improved children's weekly interactive scrolling calendar apparatus which avoids the disadvantages, limitations, above-recited, obtained from previous calendar systems.

SUMMARY OF THE INVENTION

It is also the object of this invention to teach a children's weekly interactive scrolling calendar which is simple to install and use and that will enable the children to easily handle and will provide interest for the children. Particularly, it is the object of this invention to set forth a children's weekly interactive scrolling calendar apparatus, for use by teachers and individuals to allow children to develop their sense of time using visual and tangible means for marking its passage, comprising a frame; said frame having a flat horizontal panel for viewing and marking of the calendar; said frame further having a solid back section of flat horizontal panel for providing a support surface for the calendar; said frame further having extended sections at each end of said frame; said extended sections having apertures located therein; said frame further having rods inserted in said apertures for permitting the rolling and unrolling of said calendar as desired by the operator; rolled parchment means for being inserted into said rods to allow for scrolling of said rolled parchment means from said rod at one end of said frame to the opposite end thereof; said frame further having retaining means for said rolled parchment means for maintaining said rolled parchment means in said flat horizontal panel of said frame; said frame further having a marking guide slideably attached to said flat horizontal panel of said frame for allowing the user to section off said rolled parchment means into days of the week; and said frame further having wall attaching means on said solid back section for positioning said children's weekly interactive scrolling calendar apparatus.

It is another object of this invention to teach a method of generating a children's weekly interactive scrolling calendar, for use by teachers and individuals to allow children to develop their sense of time using visual and tangible means for marking its passage, comprising the steps of providing an apparatus for allowing individuals to mark as desired the lines for the days of the week for an entire year on a week to week basis; attaching a separate attaching means to a wall or blackboard; positioning a roll of parchment on the apparatus; positioning a marking guide on the top edge of the frame; hanging the entire apparatus on the separate attaching means; removing the apparatus from the wall when the children are ready to use it; drawing the lines for the days of the week on the first day of the week; writing, drawing or coloring in the activities, days and/or dates on the calendar on each of the days; scrolling the week up at the end of the week; repeating the routine each week during the year; and reviewing at anytime at the end of the year to show a personalized diary of the year.

BRIEF DESCRIPTION OF THE DRAWINGS

Further objects and features of this invention will become more apparent by reference to the following description taken in conjunction with the accompanying figure, in which:

FIG. 1 is a bottom plan view of a novel children's weekly interactive scrolling calendar apparatus;

FIG. 2 is a side elevational view thereof;

FIG. 3 is a front elevational view thereof;

FIG. 4 is a rear elevational view thereof; and

DETAILED DESCRIPTION OF THE PREFERRED EMBODIMENT

Figure 5:
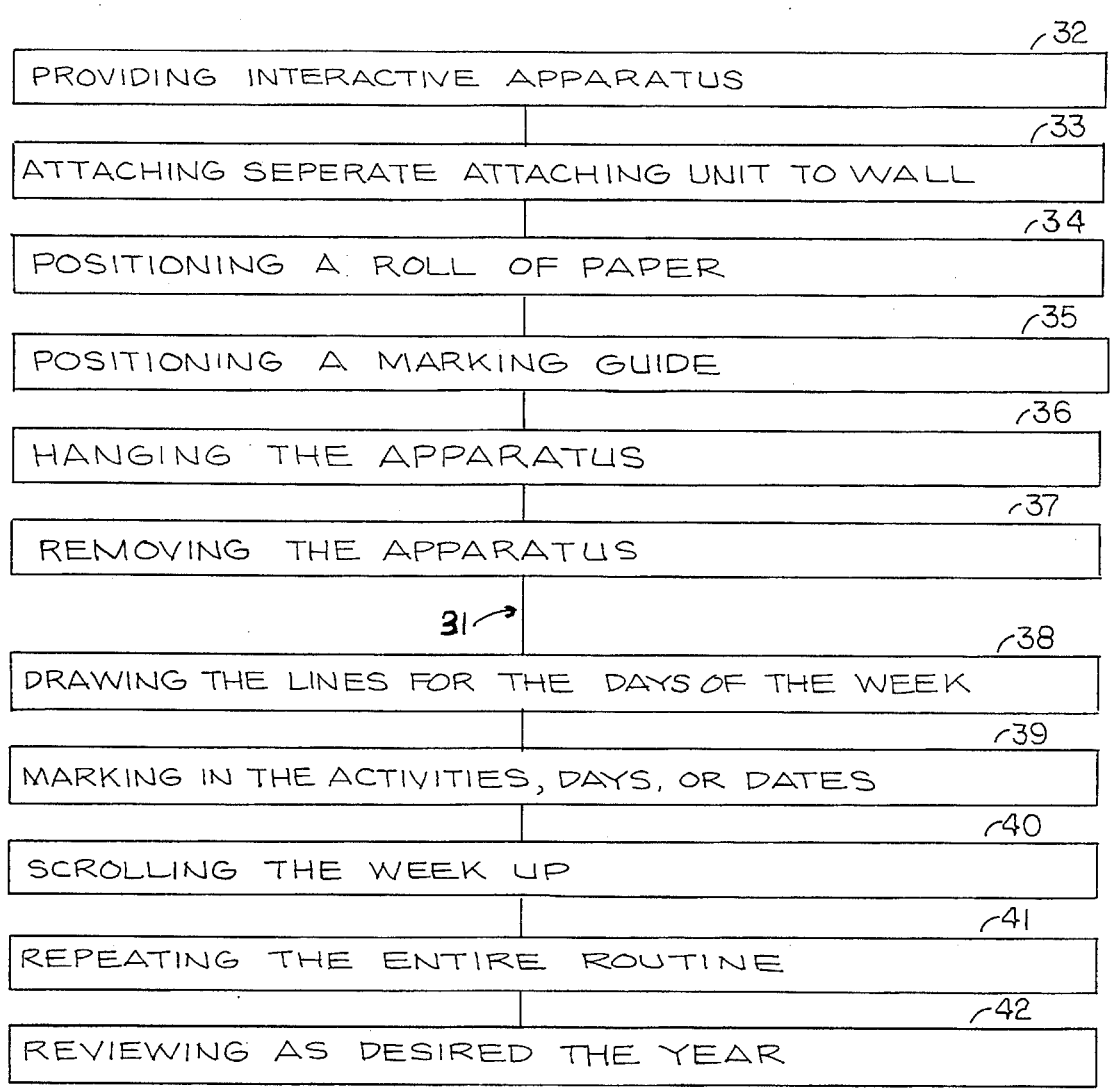
FIG. 5 is a block diagram of the novel method thereof.

As shown in the figures, the novel children's weekly interactive scrolling calendar apparatus 10 is comprised of a flat horizontal plate 11 that has perpendicular extensions 12, 12a, 12b and 12c at each end of the flat horizontal plate 11. Apertures 13 and 13a are drilled through the perpendicular extensions 12, 12a, 12b and 12c. A vertical spindle 14 and 14a passes through the apertures 13 and 13a. A roll of blank paper 15 (shown in hatched outline for clarification purposes) is held by the vertical spindle 14 at one end and is passed under retaining rods 16 and 16a and then attached to the other spindle 14a for the days of the week to be read left to right and be in order from week to week. The paper 15 is held flat on the flat horizontal plate 11 by means of the retaining rods 16 and 16a. The vertical spindles 14 and 14a can use o-rings to smooth the operation of the paper. Enlarged handles 17 and 17a allow the children to more easily turn rolls of paper. The apparatus 10 has a slideable marking guide 18 that is used by the children to mark the days of the week and grooved bottom notches 19, 19a, 19b, 19c, 19d and 19e are used to show an equidistant space in order to make the weekdays evenly sized spaces. The solid back 20 of the flat horizontal plate 11 contains the attachment system which is comprised of a formed separate piece 22 that is detached and screwed into the wall or any vertical surface and then the formed strip 21 remaining on the back of the apparatus is fit into a slot on the separate piece. This allows for very easy and sturdy attachment and removal of the apparatus. The apparatus is designed to last for the long haul and is made of hardwood construction although other material can be used.

The novel method 31 disclosed in the application includes the steps of generating an apparatus for allowing individuals to mark as desired the lines for days of the week for an entire year on a week to week basis 32; attaching the separate attaching means to a wall or vertical surface 33; positioning a roll of paper on the apparatus 34; positioning the marking guide on the top edge of the frame 35; hanging the entire apparatus on the separate attaching means 36; removing the entire apparatus from the wall when the children are ready to use it 37; drawing the lines for the days of the week on the first day of that week 38; writing, drawing or coloring in the activities, days and/or dates on the calendar on each of the days 39; scrolling the week up at the end of the week 40; repeating the entire routine each week during the year 41; and reviewing the entire year at any time or at the end of the year to show a personalized diary of the school year 42.

The use of the apparatus and the method accomplishes a number of goals. It shows time as a continuum in that the roll of paper moves from the present to the past with the future always being blank. It demonstrates that time can be recorded in a sequential way. It reinforces the concept that time passes in equal, successive intervals. It demonstrates time as being continuous, commonly shared and recordable in a consistent manner. It presents the pattern of the days of the week repeated constantly. It strengthens the children's awareness of the duration of twenty four hours and it serves as an aid in memory retrieval. It also provides a real life time line of actual experiences for the child.

While I have described my invention in connection with specific embodiments thereof, it is clearly to be understood that this is done only by way of example and not as a limitation to the scope of my invention as set forth in the objects thereof and in the appended claims.

I claim:

1. A children's weekly interactive scrolling calendar apparatus, for use by teachers and individuals to allow children to develop their sense of time using visual and tangible means for marking its passage, comprising:

a frame;

said frame having a flat horizontal panel for viewing and marking of a calendar;

said frame further having a solid back section of said flat horizontal panel for providing a support surface for the calendar;

said frame further having extended sections at each end of said frame;

said extended sections having apertures located therein;

said frame further having rods inserted in said apertures for permitting the rolling and unrolling of said calendar as desired by the operator;

rolled parchment means for being inserted onto said rods to allow for scrolling of said rolled parchment means from the rod on one end of said frame to the opposite end thereof;

said frame further having retaining means for said rolled parchment means to maintain said rolled parchment means on said flat horizontal panel of said frame;

said frame further having a marking guide slideably attached to said flat horizontal panel of said frame for allowing the user to section off said rolled parchment means into lines for the days of the week; and said frame further having wall attaching means on said solid back section for positioning said children's weekly interactive scrolling calendar apparatus.

2. A children's weekly interactive scrolling calendar apparatus, according to claim 1, wherein:

said frame comprises a rigid material for permitting long wearing and easy cleaning of said frame; and said rigid material comprises hardwood construction.

3. A children's weekly interactive scrolling calendar apparatus, according to claim 1, wherein:

said flat horizontal panel having grooves cut on the bottom therein for marking the lines for days of the week on said rolled parchment means; and said grooves are cut equidistant intervals in said flat horizontal panel thereon.

4. A children's weekly interactive scrolling calendar apparatus, according to claim 1, wherein:

said rods of said frame comprise vertical spindles for rotating to allow the movement of said rolled parchment means from one of said rods to the other of said rods; and said vertical spindle having knob means located at one end of said vertical spindles for permitting the user to rotate said vertical spindles.

5. A children's weekly interactive scrolling calendar apparatus, according to claim 1, wherein:

said retaining means comprises small vertical rods positioned at the portion of each of said extended sections closest to the center of said frame.

6. A children's weekly interactive scrolling calendar apparatus, according to claim 1, wherein:

said marking guide comprises a vertical platform slideably attached to said flat horizontal panel for allowing the user to position the marker as desired on said frame and allow the user to mark the lines for the days of the week.

7. A children's weekly interactive scrolling calendar apparatus, according to claim 1, wherein:

said wall attaching means of said apparatus comprises first means being a separate piece to be positioned on the wall and screwed into position, and second means attached on the rear of said solid back section comprising a fitted piece that inserts into position on said first means.

8. A method of generating a children's weekly interactive scrolling calendar apparatus, for use by teachers and individuals to allow children to develop their sense of time using visual and tangible means for marking its passage, comprising the steps of:

providing an apparatus for allowing individuals to mark as desired the days of the week for an entire year on a week to week basis;

attaching separate attaching means to a wall or vertical surface;

positioning a roll of parchment on the apparatus;

positioning a marking guide on the top edge of the frame;

hanging the entire apparatus on the separate attaching means;

removing the apparatus from the wall when the children are ready to use it;

drawing lines for the days of the week on the first day for that week;

marking in the activities, days and/or dates on the calendar on each of the days;

scrolling the parchment up at the end of the week;

repeating the routine each week during the year; and reviewing the entire year as desired or at the end of the year to show a personalized diary of the year.

9. A method of generating a children's weekly interactive scrolling calendar apparatus, according to claim 8, wherein:

said providing an apparatus comprises providing a frame with a flat horizontal panel with extended sections at each end, a solid back section, apertures positioned in each extended sections, rods inserted within said apertures, retaining means, a roll of paper, a marking guide and wall attaching means.

10. A method of generating a children's weekly interactive scrolling calendar apparatus, according to claim 8, wherein:

said positioning a roll of parchment comprises inserting the rods through the aperture and through the roll of paper on one side of the frame, threading the paper roll through the retaining means, and attaching securely the paper to the opposite rod.

* * * * *